(12) United States Patent
Hariharan

(10) Patent No.: US 9,814,110 B1
(45) Date of Patent: Nov. 7, 2017

(54) POWER FACTOR CORRECTION IN AND DIMMING OF SOLID STATE LIGHTING DEVICES

(71) Applicant: Maxim Integrated Products, Inc., San Jose, CA (US)

(72) Inventor: Suresh Hariharan, Livermore, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 381 days.

(21) Appl. No.: 14/095,678

(22) Filed: Dec. 3, 2013

Related U.S. Application Data

(62) Division of application No. 12/547,265, filed on Aug. 25, 2009, now Pat. No. 8,629,629.

(60) Provisional application No. 61/091,715, filed on Aug. 25, 2008, provisional application No. 61/161,724, filed on Mar. 19, 2009.

(51) Int. Cl.
*H05B 33/08* (2006.01)

(52) U.S. Cl.
CPC ..... *H05B 33/0845* (2013.01); *H05B 33/0896* (2013.01)

(58) Field of Classification Search
USPC ......... 315/224–225, 291, 297, 295, 307–308
See application file for complete search history.

(56) References Cited

U.S. PATENT DOCUMENTS

| 5,134,355 A | 7/1992 | Hastings |
| 6,909,622 B2 | 6/2005 | Weng |
| 7,750,616 B2 | 7/2010 | Liu |
| 7,804,256 B2 | 9/2010 | Melanson |
| 8,212,491 B2 | 7/2012 | Kost et al. |

(Continued)

FOREIGN PATENT DOCUMENTS

| DE | 10119491 A1 | 7/2002 |
| WO | 2009055821 A1 | 4/2009 |
| WO | 2009138478 A1 | 11/2009 |

OTHER PUBLICATIONS

Maxim Integrated Products, Inc., "High-Power LED Driver with Integrated High-Side LED Current Sense and PWM Dimming MOSFET Driver," Product Specification, 19-4235; Rev 1; Feb. 2009 (23pgs).

(Continued)

*Primary Examiner* — Douglas W Owens
*Assistant Examiner* — James H Cho
(74) *Attorney, Agent, or Firm* — North Weber & Baugh LLP

(57) ABSTRACT

An apparatus and method provides a driver circuit that provides for power factor correction (PFC) to a load, such as a solid-state lighting (SSL) device, such as, for example, a light emitting diode (LED) or an array or cluster of LEDs. A programmable reference is provided in the circuit to operate in a fixed frequency peak current mode control (FFPCMC) or in a fixed frequency average current mode control (FFACMC). A driver circuit is employed to operate the SSL device using power derived from a main power source which may be DC or AC. In a FFPCMC embodiment, a programmable power reference is programmed to be a fixed DC voltage. In a FFACMC embodiment, source input current to the circuit can be programmed to be proportional to the rectified AC voltage after a bridge rectifier.

19 Claims, 11 Drawing Sheets

(56) References Cited

U.S. PATENT DOCUMENTS

| | | | |
|---|---|---|---|
| 2007/0182347 A1* | 8/2007 | Shteynberg | H05B 33/0815 |
| | | | 315/312 |
| 2008/0180036 A1 | 7/2008 | Garrity et al. | |
| 2008/0278092 A1* | 11/2008 | Lys | H05B 33/0815 |
| | | | 315/247 |
| 2008/0316781 A1 | 12/2008 | Liu | |
| 2010/0207536 A1* | 8/2010 | Burdalski | H05B 33/0818 |
| | | | 315/224 |

OTHER PUBLICATIONS

PCT International Search Report dated Apr. 23, 2010, in corresponding International Application No. PCT/US2009/054949.
Written Opinion dated Apr. 23, 2010, in corresponding International Application No. PCT/US2009/054949.
Office Action dated Oct. 26, 2012, in Chinese Patent Application No. 200980133521.1 (18pgs).
Office Action dated Jul. 22, 2013, in Chinese Patent Application No. 200980133521.1 (9pgs).
Notice of Decision to Grant a Patent dated Nov. 25, 2013, in Chinese Patent Application No. 200980133521.1 (2pgs).
Response dated Mar. 22, 2013, in Chinese Patent Application No. 200980133521.1 (15pgs).
Response dated Sep. 24, 2013, in Chinese Patent Application No. 200980133521.1 (4pgs).

\* cited by examiner

POWER FACTOR CORRECTION IN AND DIMMING OF SOLID STATE LIGHTING DEVICES

CROSS REFERENCE TO RELATED PATENT APPLICATIONS

The present application is a divisional of and claims priority under 35 U.S.C. §120 to co-pending U.S. patent application Ser. No. 12/547,265, titled "Power Factor Correction in and Dimming of Solid State Lighting Devices," filed Aug. 25, 2009, which claims priority to U.S. Provisional Application Ser. No. 61/091,715, titled "Power Factor Correction in Solid State Lighting Devices," filed Aug. 25, 2008, and U.S. Provisional Application Ser. No. 61/161,724, titled "LED Driver Compatible with an Electronic Transformer," filed Mar. 19, 2009, by Suresh Hariharan, which applications are hereby incorporated herein by reference in their entireties.

BACKGROUND

A. Technical Field

The present invention relates to a control system for controlling currents in an electronic system. More particularly, the present invention relates to a control system for controlling the current in drivers for solid-state lighting (SSL) devices, such as, for example, a light emitting diode (LED) or an array or cluster of light emitting diodes (LEDs) having driver circuitry that is compatible with electronic transformers and supports dimming functionality. It also applies to solid state lighting without electronic transformers that operate directly off an AC source.

B. Background of the Invention

Solid-state lighting (SSL) refers to a type of lighting that utilizes light-emitting diodes (LEDs) as sources of illumination rather than electrical filaments or gas. There are several types of LEDs popularly used in solid-state lighting (SSL). The first type of LED, and the most commonly used type of LED, is the semiconductor LED. A semiconductor LED consists of a chip of semiconducting material impregnated or doped with impurities to create a p-n junction. Other types of LEDs suitable for SSL include organic LEDs or light emitting polymers (LEPs). In these LEDs, an emissive electroluminescent layer is composed of a film of organic compounds. The layer usually contains a polymer substance that allows suitable organic compounds to be deposited which are capable of producing light. As used herein, the term, "light emitting diode (LED)" includes any type of such solid state lighting device including semiconductor LEDs, organic LEDs or LEPs.

The benefits and wide-range applicability of LEDs in today's lighting systems are now realized and recognized by those skilled in the art. For many years, halogen-based lamps were the primary light source implemented within lighting systems. Over the past years as LED technology has developed, the advantages of LEDs over halogen lamps have become increasingly apparent. When compared to halogen lamps, LEDs are relatively smaller, and have a longer operating life. Another important difference between halogen bulbs and LEDs is the significantly less amount of power required by LEDs to operate. For example, a halogen lamp may operate within a range of 20-50 Watts and an LED at about 5-15 Watts.

The term "solid-state" refers to the fact that light in an LED is emitted from a solid object (e.g., a block of semiconductor or organic layers or materials) rather than from a vacuum or gas tube, as is the case in traditional incandescent light bulbs and fluorescent lamps. Unlike traditional lighting, SSL creates visible light with reduced heat generation or parasitic energy dissipation. In addition, its solid-state nature provides for greater resistance to shock, vibration, and wear, thereby increasing its lifespan significantly. The watts-per-lumen output of SSLs are also higher than incandescent light bulbs and fluorescent lamps. These advantages make SSLs particularly attractive for commercial and domestic lighting purposes, and are, therefore, increasingly replacing filament or gas-based lighting applications.

When LEDs are used for lighting applications, a cluster or an array of LEDs is used to achieve the requisite brightness and other desired lighting characteristics. Regardless of color, type, color, size or power, all LEDs work the best when driven with a constant current. LED manufacturers specify the characteristics (such as lumens, beam pattern, color) of their devices at a specified current value. One or more LED drivers are used to effectively control the electrical characteristics of the array of LEDs to suit the lighting. A LED driver is a self-contained power supply that has outputs matched to the electrical characteristics of the array of LEDs. Most LED drivers are designed to provide constant currents to operate the array of LEDs.

SSLs are powered in the same way as other lighting applications, namely, starting with and using an alternating current (AC) power source. Depending on the geographic location or application, the AC source could range between 110V and 240V. The frequency of these AC sources ranges between 50 Hertz and 60 Hertz. When AC power sources are used in SSLs, there is a need for power factor correction (PFC) to minimize losses in the AC power. PFC is the ratio between the actual load power and the apparent load drawn by an electrical load, e.g., the LED driver. PFC is a measure of how effectively the current is being converted into useful work output and, more particularly, is a good indicator of the effect of the load current on the efficiency of the power supply system.

In prior art approaches, LED drivers with PFC comprise at least two popular processing stages. The first stage is the power factor correction stage, which produces a regulated high voltage. The second stage includes a DC/DC/LED driver stage, which delivers a DC current to the array of LEDs. This approach requires a high value capacitor across the array of LEDs to effectuate the load delivery. Although this approach enables PFC in SSL, it has several disadvantages. These disadvantages include the use of higher number of total components to drive the LED driver, and a corresponding increase in cost of the LED driver circuitry. This approach also includes operational inefficiencies, as it requires the input AC source to be converted to DC before applications to the array of LEDs. Prior art approaches also require the LED current to be measured and monitored in order to achieve PFC, further contributing to the operational inefficiency.

Analog dimmers are gradient switches used with incandescent and fluorescent lighting applications to control the intensity or magnitude of the light output. Because incandescent and fluorescent lighting applications are being replaced with SSLs, it is beneficial and efficient to have the LED drivers operate with existing analog dimmers.

SUMMARY OF THE INVENTION

Methods and systems to provide power factor correction in a solid-state lighting application are provided. In one embodiment, the present invention provides an apparatus for providing solid state lighting (SSL). The apparatus comprises a main power source for supplying an AC or DC power source to the SSL driver. The apparatus further comprises a plurality of SSL devices, such as an LED cluster or LED array, to provide the lighting output. The apparatus also comprises an LED driver to operate the LED array. In one embodiment, the LED driver uses fixed frequency average current mode control (FFACMC) to control the input current drawn, for example, after a diode bridge rectifier, which follows the waveform that is programmed on a control pin of the driver chip. The driver circuit does not control the load current. In this case, using the fixed frequency average current mode control, the input current beyond the bridge rectifier can be programmed to be a DC current or a rectified sinusoidal voltage depending what is programmed at the REFI or control pin of the driver circuit, i.e., the REFI is a programmable reference in the driver circuit acts upon the input signal. The control circuit of the driver controls the input current to the LED driver to be in phase with the voltage. By configuring the current to the LED driver to be in phase with the main power source input voltage, the LED driver appears as a substantially resistive load across the main power source, allowing for power factor correction (PFC). In using the fixed frequency average current mode control (FFACMC), the input current $I_{IN}$ is equal to the control voltage $V_{REF}$ on the REFI pin value based upon the current sense resistor, $R_S$.

For most applications, the REFI reference can be programmed to be a fixed DC voltage. Fixed frequency average current mode control (FFACMC) can be employed so that the input current can be programmed to be proportional to the rectified AC voltage after the bridge rectifier or to the DC voltage programmed on the REFI pin. In either case, the power factor will be very high, such as greater than 0.90. Also, the LED driver circuit will operate with dimmers to adjust the light intensity of the SSL device.

In one embodiment, the control circuit is configured to enable the LED driver to provide a switching or altering current to the LED array. In this embodiment, a substantially small capacitor is connected across the LED array load. Because the large capacitance required by the two-stage prior art approach is eliminated, The present invention also provides a method to achieve power factor correction (PFC) in solid state lighting applications. In one embodiment, the method provides employing a main power source as an electronic circuit. The electronic circuit comprises a plurality of LEDs arranged in an LED array, and also comprises an LED driver to operate and drive the LED array. The method further provides configuring the LED driver using a control circuit to enable the input current to the LED driver to be in phase with the main power source. This method also provides configuring the LED driver such that it appears as a substantially resistive load across the main power source. In one embodiment, the method provides using an external voltage supplied by an analog dimmer to control the output of the LED array. In another embodiment, the power source includes a dimmer and averaged current mode controlled LED driver circuit. In this embodiment, a transformer may be employed for isolation.

In the case of low voltage MR16 applications, where halogen lamps are replaced with compatible LED lamps, this type of application typically employs 12V AC derived from an electronic transformer. The driver circuit of the present invention operates with a majority of the electronic transformers with trailing edge type of dimmers. The only requirement that needs to be satisfied is that the programmed DC input current be of a sufficient value to keep the electronic transformer operational. In this regard, some electronic transformers will need a higher current drawn from the input of the driver than the programmed DC value.

BRIEF DESCRIPTION OF THE DRAWINGS

Reference will be made to embodiments of the invention, examples of aspects of which may be illustrated in the accompanying figures. These figures are intended to be illustrative, not limiting. Although the invention is generally described in the context of these embodiments, it should be understood that the scope of the invention is not limited to the particular embodiments thereof disclosed herein.

DETAILED DESCRIPTION OF THE INVENTION

In the following description, for the purpose of explanation, specific details are set forth in order to provide an understanding of the invention. It will be apparent, however, to one skilled in the art that the invention may be practiced without selected of these details. One skilled in the art will recognize that embodiments of the present invention, some of which are described below, may advantageously be incorporated into a number of different devices and systems. Structures and devices shown in block diagram are illustrative of exemplary embodiments of the invention and are included to avoid obscuring the invention. Furthermore, connections between components within the figures are not intended to be limited to direct connections. Rather, such connections between components may be modified, reconfigured, or otherwise changed by intermediary components.

Reference herein to "one embodiment" or "an embodiment" of the invention means that a particular feature, structure, characteristic, or function described in connection with the embodiment is included in at least one embodiment of the invention. The use of the phrase "in one embodiment" at various locations in the specification are not necessarily all references to a single embodiment of the invention.

Figure 1:
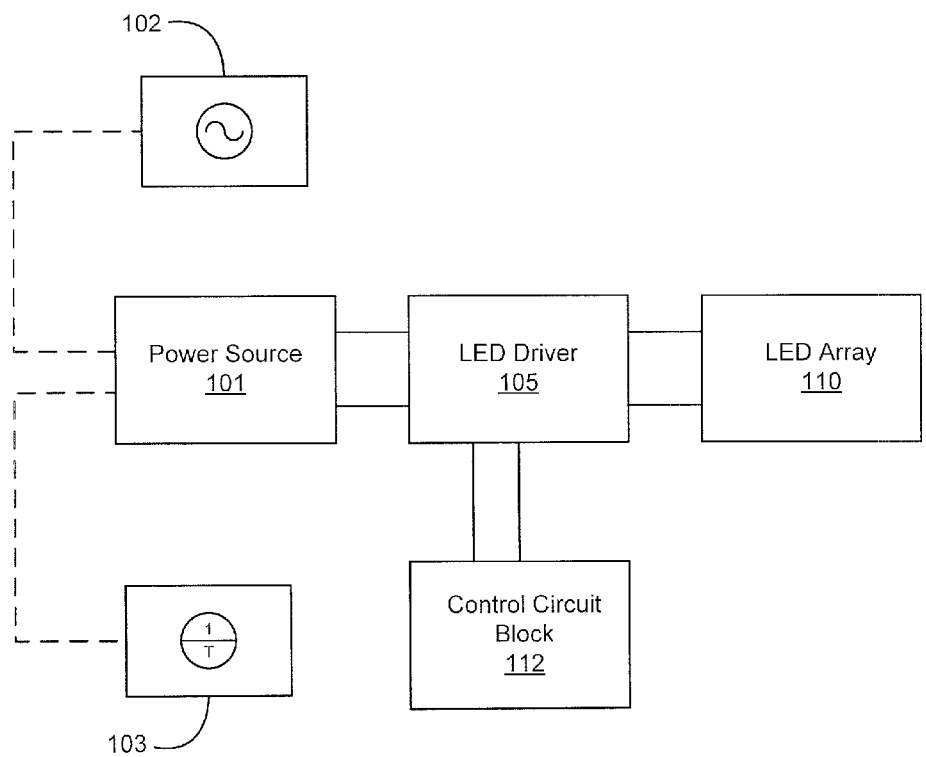
FIG. 1 illustrates an embodiment of an overall control system to implement power factor correction (PFC) in solid state lighting (SSL) applications.

FIG. 1 illustrates an embodiment of an overall control system to implement power factor correction (PFC) in solid state lighting (SSL) applications. In the case here, a main power source 101 provides power to an LED control system. In one embodiment, the main power source is a direct current (DC) power source 103, providing a DC current to power the control system. In another embodiment, the main power source is an alternating current (AC) power source 102, providing an AC current power the control system. One example is an AC current that has a sinusoidal waveform shape. Another example waveform is a square waveform. These power sources can be implemented through several means, each of which will be readily apparent to a person of skill in the art.

The power source 101 provides power to an LED driver 105, which is a driving mechanism to regulate the output of the LED array 110. There are several LED drivers that are available in the marketplace, which are readily apparent to those skilled in the art that can be employed in this embodiment. In the present embodiments, any LED driver that allows an input current to be programmed may be employed.

In one embodiment, the LED driver 105 for an LED array 110 is controlled for power factor correction (PFC) by a control circuit block 112. The driver circuit 105 receives power from the power source 101. The control circuit block 112 comprises electronic circuitry that enable the input current to the LED driver 105 to be measured and controlled. This control circuit block 112 comprises at least one switching device (not shown in FIG. 1) that enables an alternating form of current at a particular frequency to be applied to the LED array 110 regardless of whether the main power source 101 is a DC or AC power source. The functionality of the control circuit block 112 and the various components within the control circuit block 112 will be explained in further detail as it applies to additional embodiments discussed below.

The LED array 110 comprises the solid state lighting device. As the name suggests, the LED array 110 comprises an array or cluster of lighting emitting diodes (LEDs) arranged to provide the desired SSL structure. Examples of the LED devices include semiconductors LEDs, organic LEDs, polymer LEDs, etc. Other types of LEDs or other materials employed in SSL applications will be apparent to those skilled in the art, and any of these devices may be readily employed in the present invention.

In one embodiment shown in FIG. 1, the controlling block 112 is configured so as to enable the input current to the LED driver 105 to be measured and controlled. Contrary to prior approaches, the LED driver 105 does not measure any current in the LED array 110 to regulate the solid state lighting application. Instead, the LED driver 105 measures and controls the input current such that the input current to the LED driver 105 is in phase with the current of the main power course 101 in order to achieve PFC. Because the input current to the LED driver 105 is in phase with the main power source 101, the LED driver 105 appears as a resistive load across the main power source 101 and, thus, results in PFC.

Figure 2:
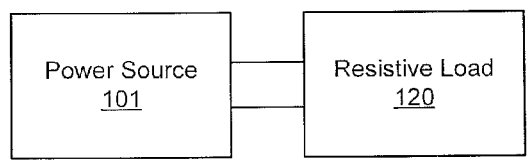
FIG. 2 is a block diagram illustrating an equivalent overall block diagram showing a resistive load.

FIG. 2 is a block diagram illustrating an equivalent circuit diagram to FIG. 1, after the input current to the LED driver 105 is measured and controlled to be in phase with the main power source 101. In the case here, LED driver 105, in equivalent, appears as a completely resistive load 120 across the main power source 101.

In addition to PFC, control circuit block 112 is configured such that the magnitude of current through LED array 110 can be controlled employing an external voltage. This external voltage may be regulated through control circuit block 112 or through the LED driver 105 or through any other means known to those skilled in the art. This feature of allowing an external control voltage to control the magnitude of current through the LED array is referred to as "analog dimming".

Some examples of specific embodiments for realizing the control system are provided in greater detail below. It is noted that the arrangement of the components and the circuitry in each of the implementations is exemplary and provided for the purpose of explaining the embodiments illustrated in this disclosure. Those skilled in the art would be able to design other combinations or arrangements to achieve PFC by controlling the input current to an LED, i.e., by measuring and controlling the input current LED driver 105 such that the input current is in phase with the main power source 101, and such that the LED driver 105 appears as a resistive load 120 across the main power source 101.

Figure 3:
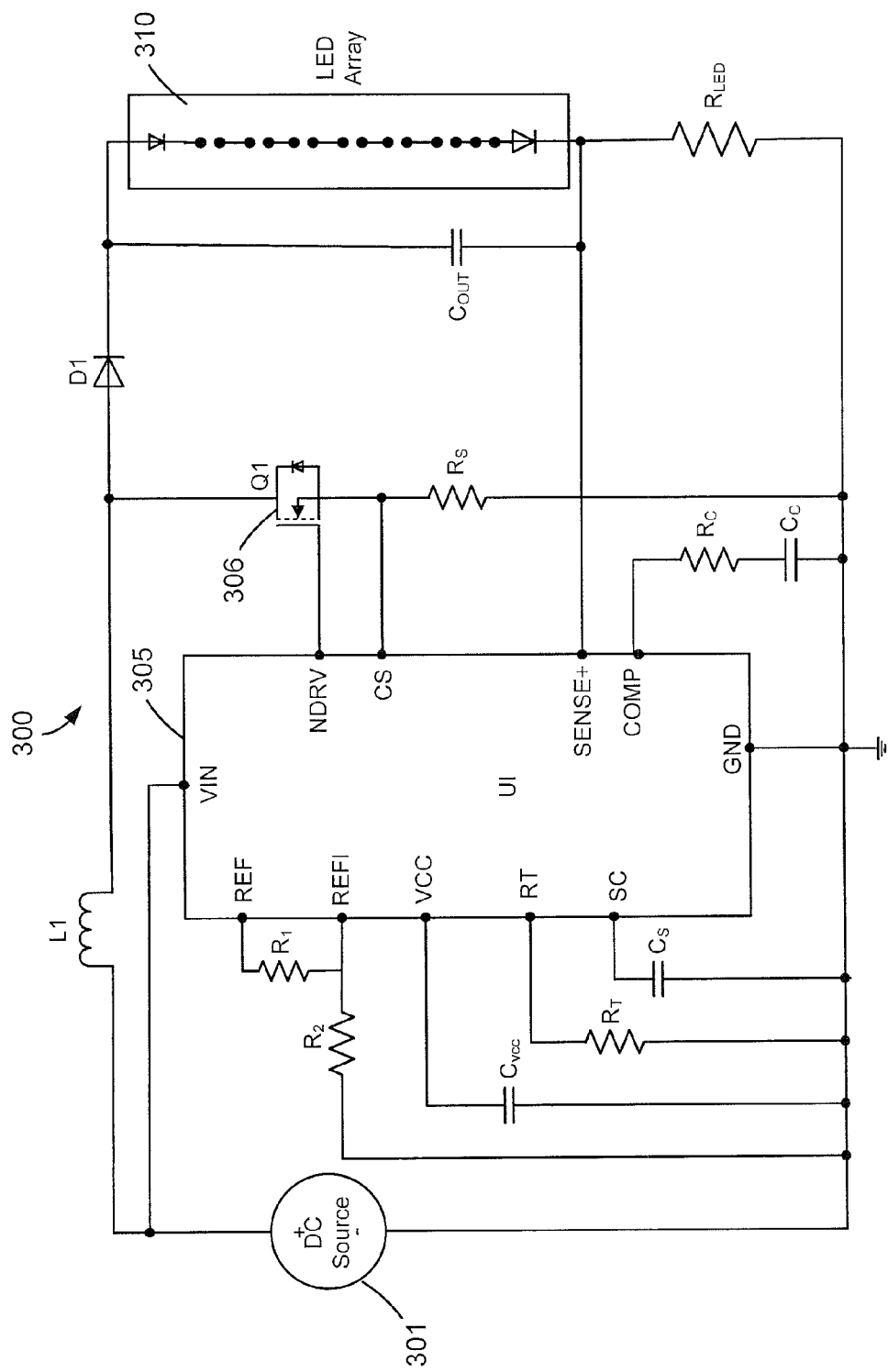
FIG. 3 provides the circuit diagram of an embodiment of present invention, where the circuit illustrates a simplified DC input boost LED driver employing a fixed frequency peak current mode control.

FIG. 3 illustrates a circuit 300 of one embodiment of the present invention where the circuit illustrates a simplified DC input boost LED driver that employs a fixed frequency peak current mode control (FFPCMC). This embodiment is an example of an LED driver that can be employed for DC input applications The circuit 300 of FIG. 3 comprises a main power source 301 which is a DC power source. DC power source 301 provides power to an LED driver 305. The LED driver 305 is configured with a combination of input electronic components to control the input current to LED driver 305. In this embodiment, the LED driver 305 is employed for illustrative purposes. It should be understood that this particular LED driver may be replaced with any other LED driver that can provide programmable current to the LED load.

An NDRV pin on the LED driver 305 is connected to a switching device 306, which may, for example, be a MOSFET 306. A regulated voltage at VCC pin of LED drive 305 drives the switching frequency of Q1. This is, in turn, powered from the input voltage at the VIN pin of LED driver 305. The voltage across the resistor $R_S$ at the CS pin of LED driver 305 is used for a cycle by cycle current mode control function in LED driver 305. This sensed current signal is employed to control the switching of MOSFET Q1.

This embodiment explained in FIG. 3 illustrates the presence of two control loops. A first inner control loop, specifically, an inner peak current mode control loop, controls the duty cycle of switching MOSFET Q1. In some embodiments, compensation is internally added to the sensed current signal to avoid sub-harmonic oscillations in inner control loop. The magnitude of the slope compensation signal is controlled by the capacitor $C_S$ at the SC pin of driver 305. Additionally, the voltage across the resistor $R_{LED}$ is used to sense the LED current. This measured voltage appears at the SENSE+ pin of driver 305.

A second outer control loop, specifically, an outer LED current regulation loop, controls the input current to LED array 310. This outer loop employs an error amplifier to regulate the input current to the LED array 310. In one embodiment, the error amplifier may be, for example, a transconductance amplifier. Additionally, the compensation components $R_C$ and $C_C$ on the COMP pin are feedback compensation components to deliver a stable control loop.

In addition to the above controls, the magnitude of the input current to the LED array can be changed by controlling the voltage at the REFI programmable reference pin of LED driver 305. Therefore, in this embodiment where main power source 301 is a DC power, the regulation (measuring and controlling) of the input current to the LED array or arrays, along with the current adjustability feature (by virtue of the REFI pin). Therefore, in this particular embodiment, the current that is controlled by LED driver 305 is not the current through the LED array or arrays, but the input current itself. Additionally, this embodiment enables the input current to LED array 310 to be proportional to the input voltage.

Figure 4:
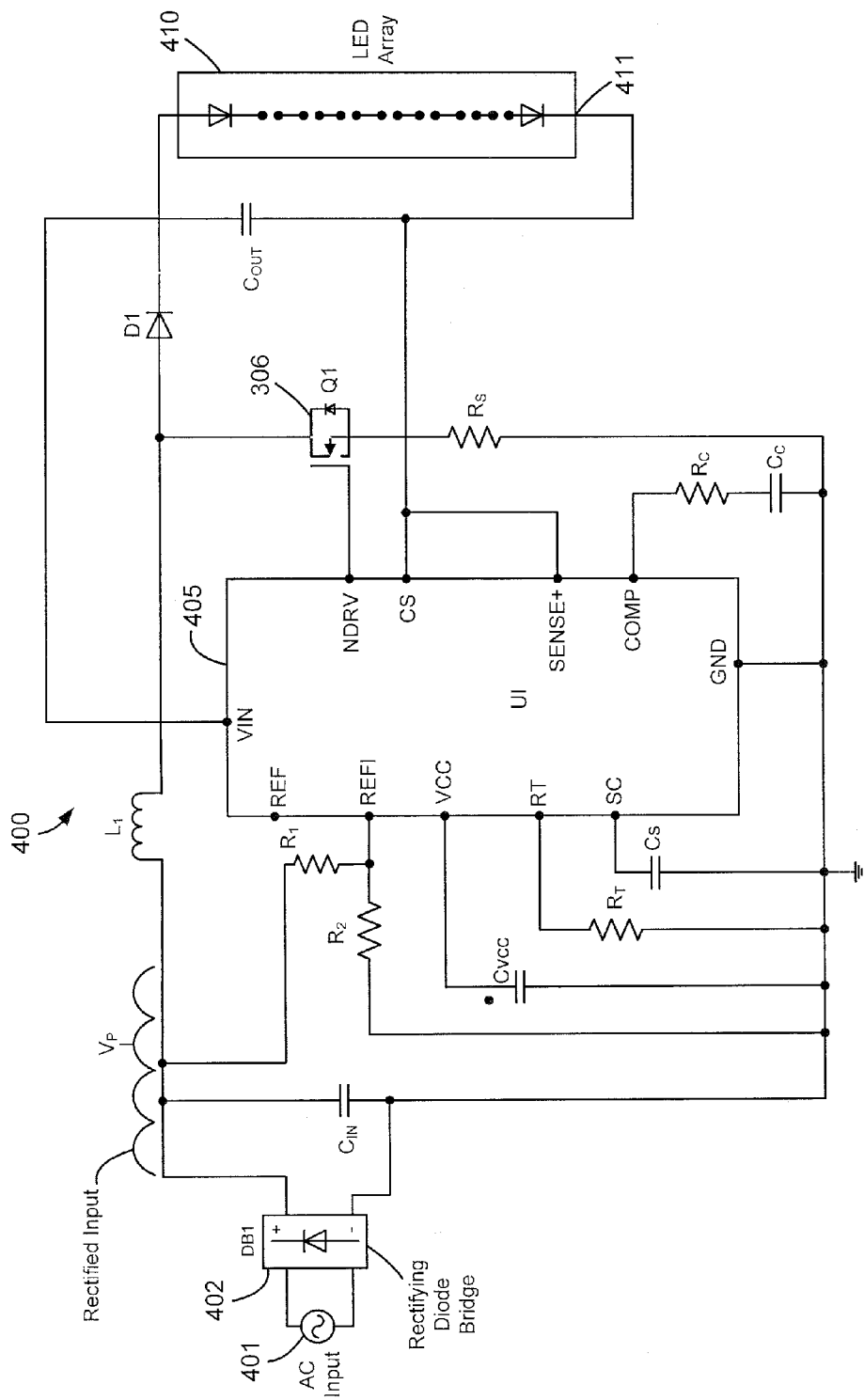
FIG. 4 illustrates a circuit diagram of an embodiment of the present invention where a boost LED driver circuit is designed for power factor correction (PFC) for an AC input.

FIG. 4 illustrates an embodiment of the present invention where a boost LED drive circuit 400 is designed for PFC for AC input applications. In this embodiment, the main power source 401 is an AC power source. The AC input current is rectified employing a rectifier bridge DB1 at 402. It will be understood by those skilled in the art that the employment of a rectifier bridge 402 in relation to AC currents provides a rectified input comprising a positive-half sine waveform having a peak voltage, $V_P$. The output of the rectifier bridge DB1 is provided to inductor L1. An inductor L2 is added for EMI filtering immediately after the rectifier bridge 402 to keep the switching currents in the loop formed by L1 and $C_{IN}$. Capacitor $C_{IN}$ is placed after the inductor L2 to smooth out any signal ripples in the signal.

In this embodiment, the rectified voltage from rectifier bridge DB1 is a rectified sine wave voltage as long as the input to rectifier bridge DB1 is an AC sine waveform. The SENSE+ pin and the CS pin of LED driver 405 are connected to cathode 411 of LED array 410. The connection for the output capacitor $C_{OUT}$ and the cathode 411 of LED array 410 is implemented as shown in FIG. 4. The capacitor $C_{OUT}$ and cathode 411 of LED array 410 are connected to the source of switching MOSFET Q1. When connected in this manner, the current in the resistor $R_S$ follows the current in the inductor L1

In the FIG. 4 embodiment, the programmable REFI pin is connected to a resistor divider, $R_1$ and $R_2$, from rectified AC input 401. This programs the input current to LED driver 405 to be proportional to the input voltage derived at rectifier bridge DB1. If the ratio of the voltage on the REFI pin to the voltage of the CS pin is denoted as G, the input current, $I_{IN}$, is given by the following equation (1)

$$I_{IN} \times R_S \times G = \frac{V_{IN} \times R_2}{R_1 + R_2} \quad (1)$$

In the above equation, $V_{IN}$ is the input voltage at the rectifier bridge DB1. Note that any drops in the diode bridge are negligible and, therefore, have been neglected in the above equation (1). The power drawn from the input current to the LED driver 405 and, hence, the power available at the LED array is controlled by LED driver 405. The equivalent resistance appearing at the input of the LED driver 405 is given by resistance, $R_{eq}$, via the following equation (2):

$$R_{eq} = \frac{(R_1 + R_2) \times R_S \times G}{R_2} \quad (2)$$

The circuit described may be employed for applications where the total voltage drop across the LED array exceeds the peak voltage at the circuit input.

The embodiment of the boost LED driver circuit as illustrated in FIG. 4 above is particularly useful in lighting applications where the total voltage drop across the LED array is greater, or is required to be greater, than the peak of the input voltage. However, an embodiment described in FIG. 5 below may be employed in lighting applications where the voltage across the LED array is or may be lower than the peak of the input voltage.

Figure 5:
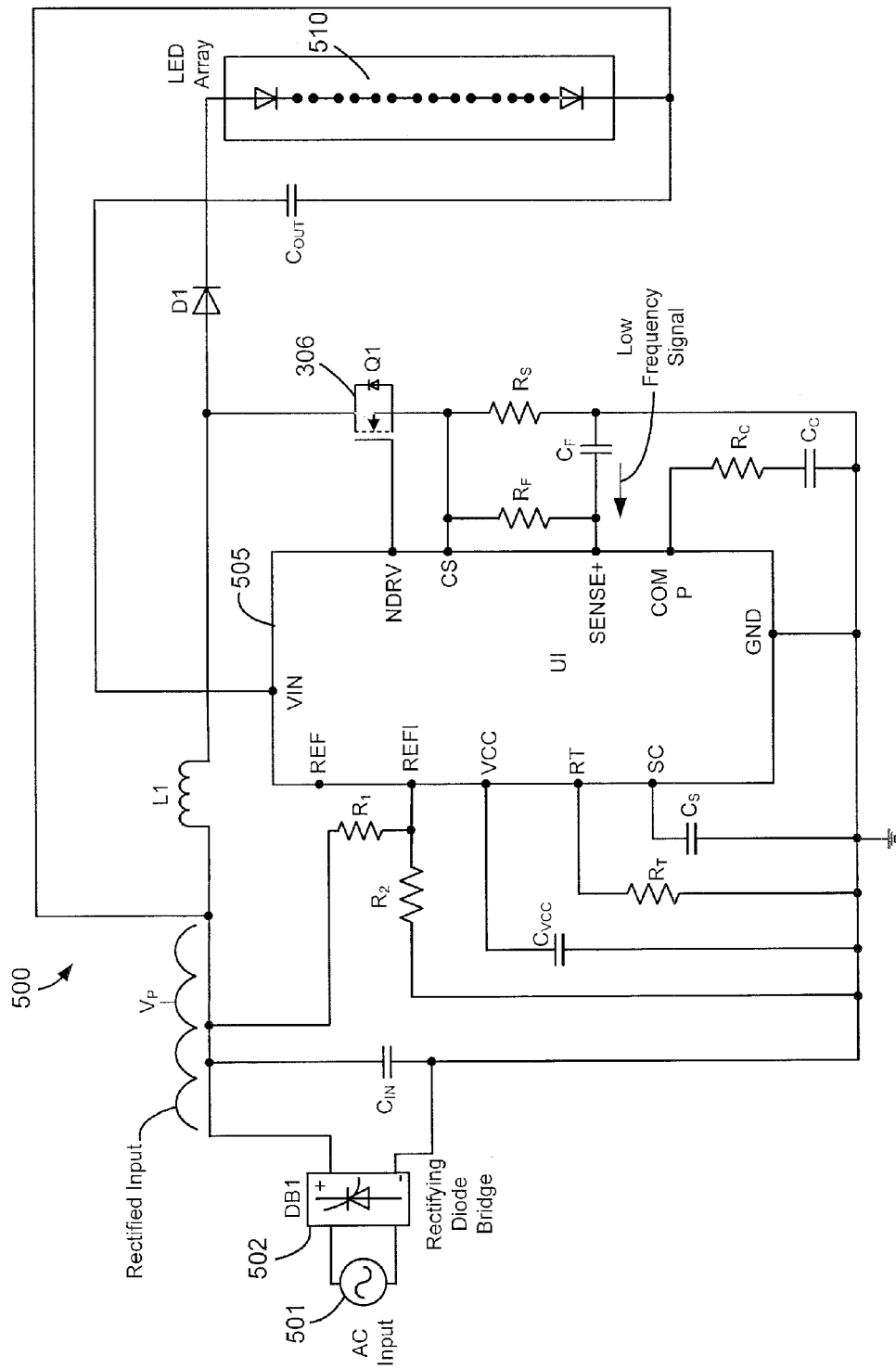
FIG. 5 illustrates a circuit diagram of an embodiment of a buck-boost type of LED driver with power factor correction (PFC)

FIG. 5 illustrates an embodiment of a buck-boost type of LED driver circuit 500 with PFC. Here, the pulsating current flowing in switching MOSFET Q1 that was previously employed by the inner peak current mode control loop, described in FIG. 3, is also employed by the outer current input control loop. The current flowing in the MOSFET Q1 pulsates at the switching frequency set by resistor $R_T$. AC input 501 to bridge 502 is normally at a lower frequency, below that of an internal switching frequency capable of device 306.

In FIG. 5, the resistor $R_f$ and capacitor $C_f$ form an RC filter circuit to filter out high frequency components in the voltage across the switch current sense-resistor $R_S$. This low frequency signal is then fed to LED driver 505 through the SENSE+ pin. The outer control loop of LED driver 505 controls the voltage appearing on the SENSE+ pin so that it is proportional to the voltage on the programmable REFI pin. Thus, the voltage on the SENSE+ pin will now be proportional to the input current to LED driver 505. Since the voltage at the REFI pin is proportional to the input voltage to driver 505, the input current is proportional to the input voltage. In this manner, circuit 500 of FIG. 5 provides one embodiment of achieving PFC for LED drivers where the voltage across LED array 510 is lower than the peak of the input voltage.

Figure 6:
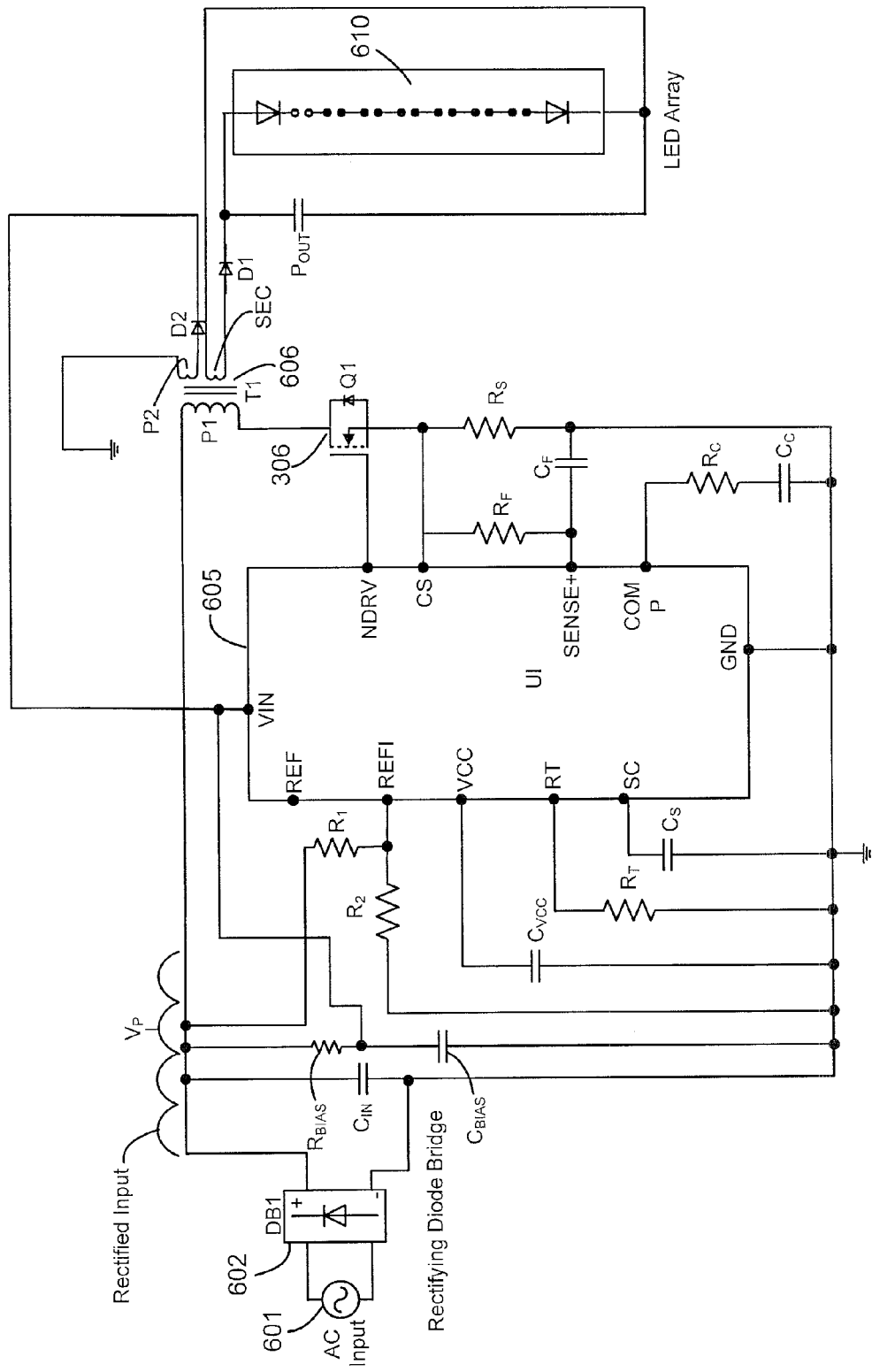
FIG. 6 illustrates a circuit diagram of an embodiment of the present invention providing isolation between an AC input and the LED array by using a transformer setup.

The embodiment illustrated in FIG. 5 may also be employed in offline LED driver circuits that require isolation between AC input and the LED array, e.g., between power source 101 and LED array 110 in FIG. 1. In such a case, a transformer is employed to achieve the requisite isolation between these two circuits, and the rectified secondary voltage is employed to power the LED array. FIG. 6 discussed below presents an embodiment of achieving a PFC LED driver circuit with isolation from the AC input.

FIG. 6 illustrates an embodiment of the present invention providing isolation between the AC input 601, via bridge 602, and the LED array 610 by employing a transformer setup T1 in the driver circuit output at 606 to the input of LED array 610. In this embodiment, the resistor $R_{BIAS}$ and capacitor $C_{BIAS}$ provide the initial startup voltage to power LED driver 605. However, as soon as LED driver circuit 605, together with switching MOSFET Q1, commences the switching function, the transformer winding, P2, provides a bootstrapped voltage to power control LED driver 605 via VIN. There is no isolation between windings P1 and P2. The secondary winding SEC coupled to array 610 is isolated from both windings P1 and P2 of transformer T1. In some cases, the power required to power the control driver circuit can be constantly powered from the circuit comprised of Rbias and Cbias or some other circuit which can then eliminate the winding P2.

In the embodiments illustrated with reference to the AC inputs, as illustrated in FIGS. 4-6, the input current to the LED array is not regulated at a DC current level. The input current to the LED array may look more like a rectified sinusoid if the original AC input waveform is sinusoidal. If the AC input has a frequency f, the current through the LED array will have a rectified sinusoidal waveform with a frequency 2f.

Prior art approaches supply a DC current to control the current in the LED array, and require a large capacitor across the LED load to effectuate the delivery. However, in the present invention, a pulsating current is applied and the LED driver circuit appears as substantially resistive load. Therefore, a capacitor, $C_{OUT}$, of minimal value is employed across the LED array load. This enables an external voltage to be employed to increase or decrease the magnitude of current provided through the LED array and, consequently, varying the light output of the LED array. In one embodiment, the external voltage supplied by an analog dimmer that is normally employed for conventional lighting devices, e.g., halogen lamps, other filament based lamps, etc., is employed to control the light output of the LED array.

Thus, various embodiments of the invention are now illustrated to provide a LED driver circuit that may be integrated within lighting systems utilizing an electronic transformer and dimming functionality. For example, embodiments of the present invention may be used to retrofit existing halogen lamp systems with LEDs. The integration of a fixed frequency averaged current mode controlled LED driver within legacy lighting systems allows these lighting systems that had traditionally delivered approximately 20 W to 50 W to a halogen lamp be modified so that approximately 5-15 W is delivered to an LED device. Additionally, the averaged current mode controlled LED driver circuit enables dimming functionality to be realized at the LED load.

Figure 7:
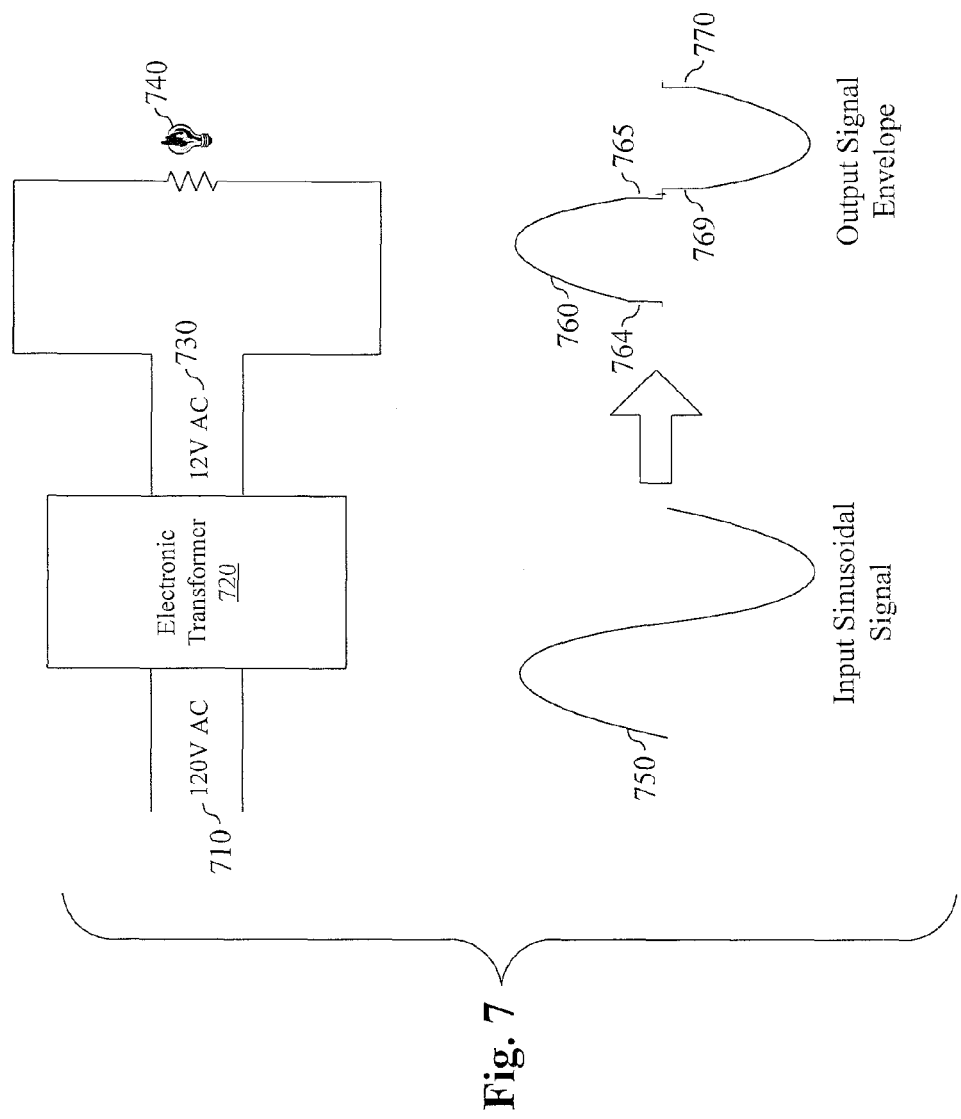
FIG. 7 is a combination general diagram showing a lighting system using a halogen lamp and a diagrammatic illustration of clipping existing on an output signal envelope from an electronic transformer.

FIG. 7 illustrates an exemplary lighting system where a halogen lamp is employed. In this example, a 120V AC signal 710 is delivered to an electronic transformer 720, which converts the signal to a 12V AC signal 730. This 12V AC signal 730 is provided to a halogen lamp 740 to generate light. The conversion of the AC signal by electronic transformer 720 from a 120V signal to a 12V signal causes chopping or clipping on the 12V output signal envelope. As shown, an input sinusoidal signal 750 is input to electronic transformer 720 and generates an output signal having an associated signal envelope 760. Electronic transformer 720 has an effective turn-on current that causes clipping 764, 765, 769, and 770 on both the leading and trailing edges of both the positive and negative portions of the waveform signal envelope. Until input signal 750 current reaches a minimum current threshold, electronic transformer 720 is effectively in an "off" state, which produces this clipped output waveform.

Figure 8:
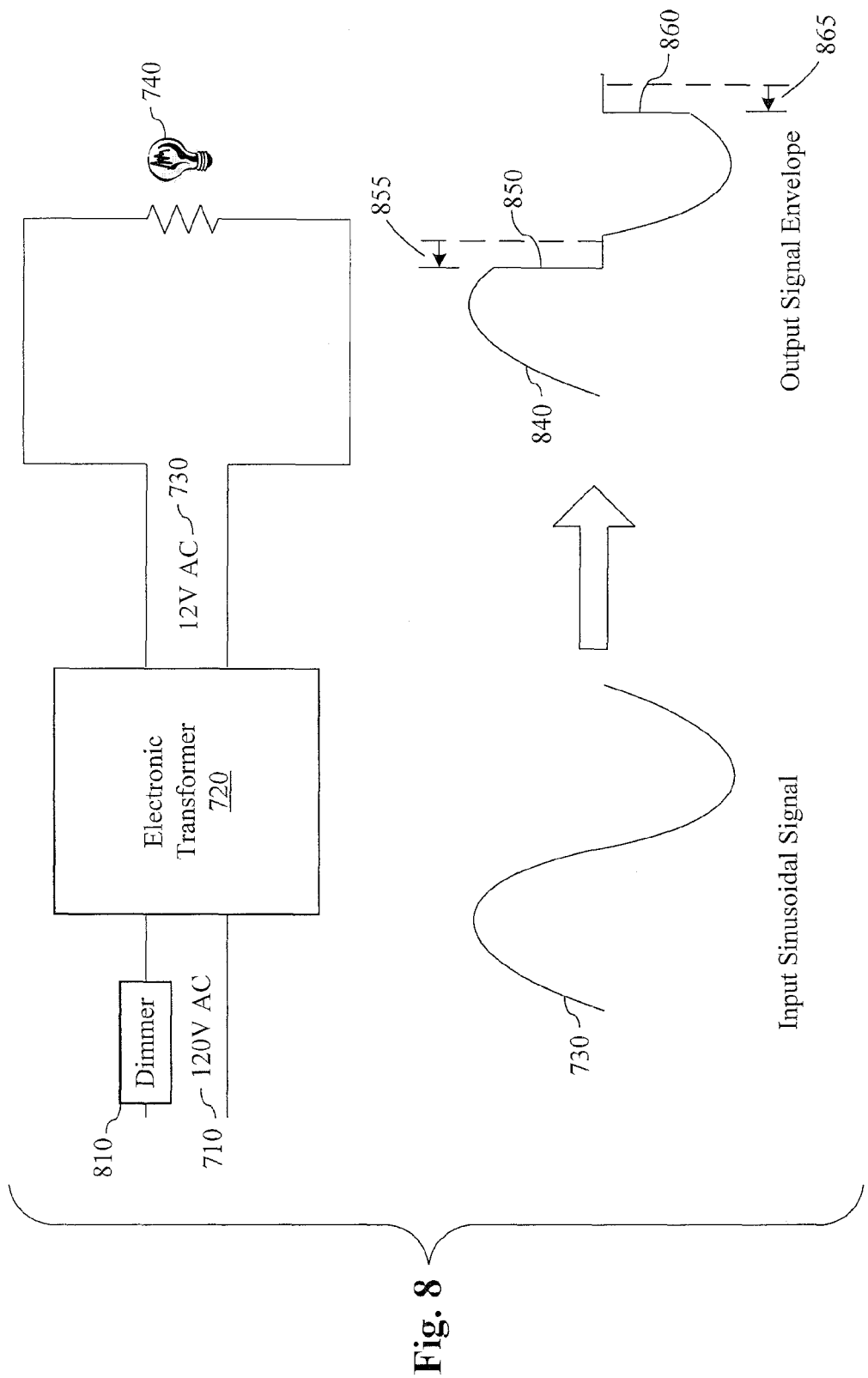
FIG. 8 is a general diagram of the lighting system having a dimmer and a diagrammatic illustration of dimming effects on the output signal envelope from the electronic transformer.

This converted AC signal is provided to halogen lamp 740, which has a light intensity that is at least partially dependent on the average power delivered to it during its operation. In certain lighting systems, this average power delivered to halogen lamp 740 may be adjusted to cause dimming. FIG. 8 illustrates an exemplary lighting system in which a dimmer is integrated. In this example, a dimmer 810 is integrated within the lighting system previously described. Dimmer 810 adjusts the average voltage of input AC signal 710 provided to electronic transformer 720 which, in turn, causes a modification of the average power delivered to halogen lamp 740.

There are different types of dimmers available on the market today including both a trailing-edge dimmer and a leading-edge dimmer. FIG. 8 illustrates the operation of a trailing-edge dimmer. In this example, input sinusoidal signal 730 is modified by both dimmer 810 and electronic transformer 720 so that the average power on the output signal envelope is further reduced by further clipping of the trailing edge of waveform envelope 840. The output signal envelope 840 is shown where the trailing edge of the positive portion of the output waveform envelope is further clipped 850 by magnitude 855 and the trailing edge of the negative portion of the output waveform envelope is further clipped 860 by magnitude 865. As a result, the average power delivered to lamp 740 is reduced and, in turn, causes its light output intensity of lamp 740 to be dimmed.

The integration of LEDs within the halogen lamp lighting system is difficult. Certain prior art LED drivers use a hysteretic or fixed frequency buck-LED to control the amount of power delivered to an LED or LED array or cluster. However, these drivers are not compatible with existing electronic transformers and are not dimmable using existing standard electronic wall dimmers.

Figure 9:
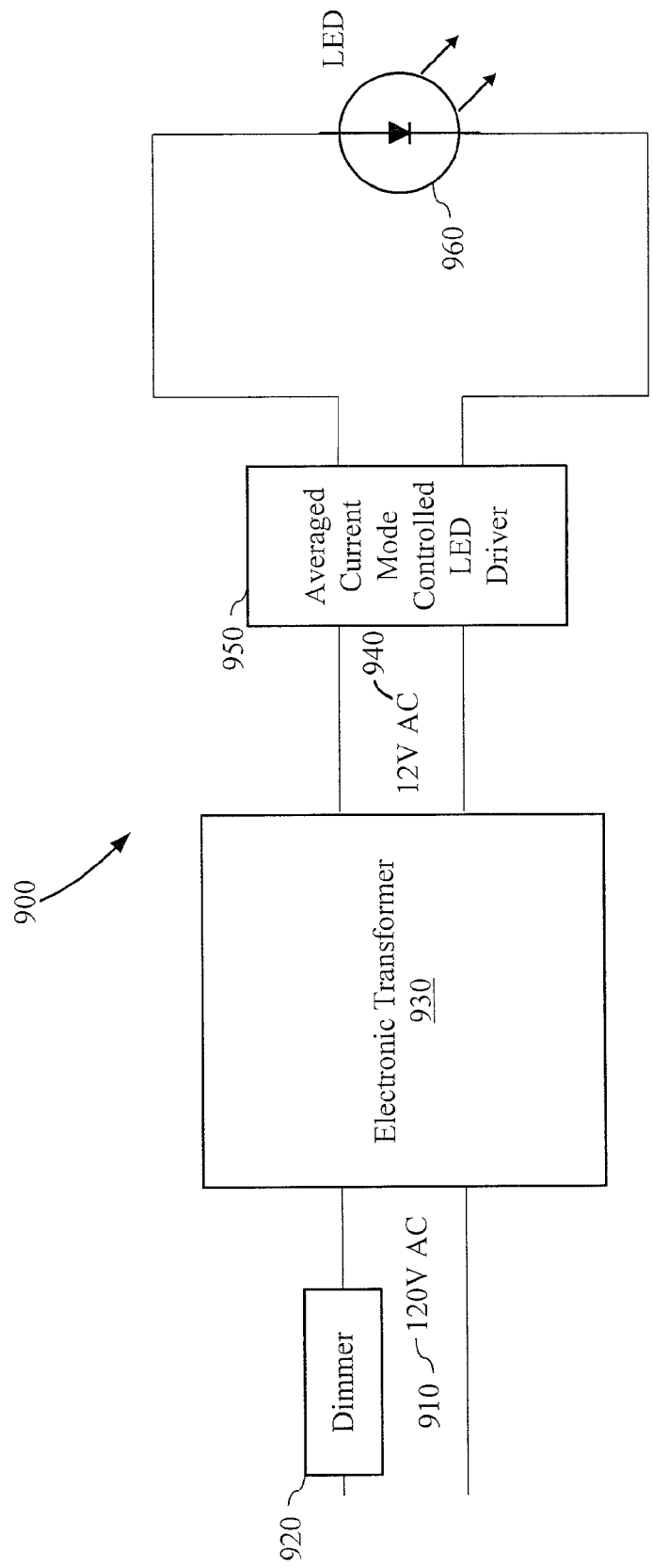
FIG. 9 is a general system diagram of a lighting system having an LED, LED driver circuitry, a dimmer and electronic transformer according to various embodiments of the invention.

FIG. 9 is a block diagram of an LED lighting system 900 according to various embodiments of this disclosure. As shown in FIG. 9, a 120V AC signal 910 is received by electronic transformer 930 together with an input from a dimmer 920 to adjust a combined average voltage provided to transformer 930. Electronic transformer 930 converts high voltage, 120 V AC signal 910 into a low voltage, 12V AC signal 940. The 12V AC signal 940 is provided as input power to averaged current mode controlled LED driver 950 which generates a signal that provides LED 960 with a corresponding appropriate amount of power. The power level on this signal output may be adjusted by dimmer 920 to effectively change the light output intensity emitted from LED 960. This power conversion from electronic transformer 930 to an appropriate LED power level is realized by the driver circuitry adjusting a current level being applied to LED nodes 962 and 964 in relation to the voltage level on 12V AC signal 940. As will be discussed in more detail below, the driver circuitry turns on and off an internal switch relative to the voltage level on 12V AC signal 940 in comparison with a voltage reference which, in turn, defines the amount of power or power level delivered to LED 960.

One skilled in the art will recognize that other components and features may be inserted within the LED lighting system, all of which are intended to fall within the scope of the present invention. Additionally, one skilled in the art will recognize that the voltage levels on input AC signal 910, the output of electronic transformer 930 and the outputs of the averaged current mode controlled LED driver 950 may be adjusted or differ according to the application and system in which the invention is applied. In certain embodiments, the averaged current mode controlled LED driver 950 may be a source for a preferred DC current derived from 12V AC signal 940. This DC current should be above a threshold level associated with a given electronic transformer 930.

Figure 10:
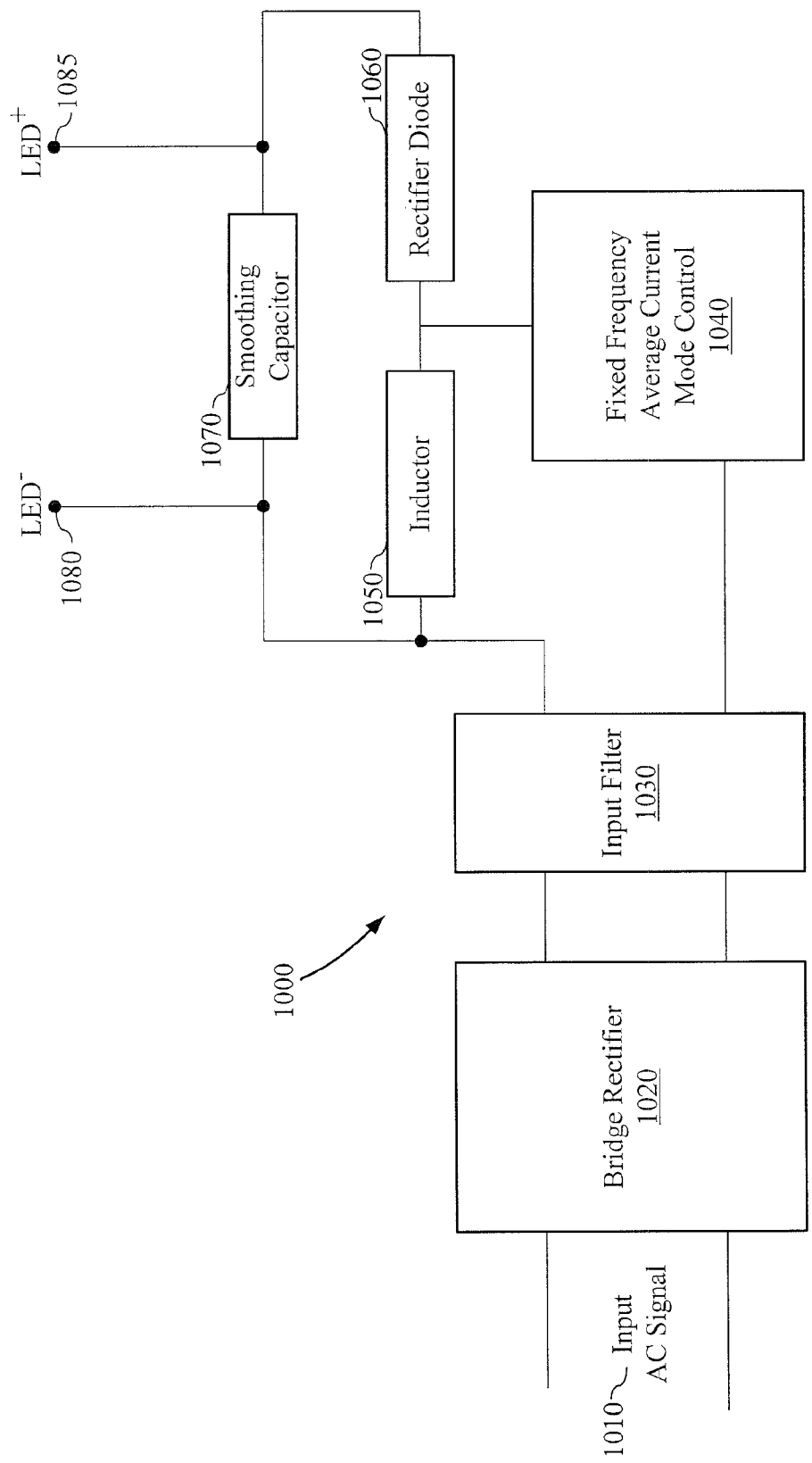
FIG. 10 is a circuit diagram of a first buck-boost mode according to various embodiments of the invention.

FIG. 10 is a general block diagram of an averaged current mode controlled LED driver 1000 according to various embodiments of the invention. As shown in FIG. 10, an AC signal 1010 is received by a bridge rectifier 1020 that provides full-wave rectification and converts AC signal 1010 into a positive signal by converting both positive and negative swings of the sinusoidal signal into repetitious positive half cycles. The input filter 1030 smoothes the rectified DC signal. One skilled in the art will recognize that LC filters, RC filters and LC filters may be readily applied for this smoothing process.

Input filter 1030 is coupled to a fixed frequency average current mode control (FFACMC) circuit 1040 that defines a power to be applied to a LED or LED array. In certain embodiments of the invention, the fixed frequency average current mode control (FFACMC) has a reference, either a voltage, current or combination of both, that controls the amount of current from input filter 1030. In one example, the fixed frequency average current mode control (FFACMC) comprises a switch that effectively defines the current from input filter 1030 by rapid turning the switch on and off which, in turn, defines the amount of power delivered across LED nodes 1080, 1085. Such switches are well known in the art and may be, for example, a transistor or other such switching devices.

A smoothing capacitor 1070 may be provided between LED nodes 1080, 1085 to smooth out ripples in the signal delivered to a LED or LED array. One skilled in the art will recognize that the various components described above may be realized using different circuits and circuit topologies. Additionally, other components may be included within the system to provide other functionality, other than light intensity dimming.

The fixed frequency average current mode control (FFACMC) circuit 1040 is able to effectively detect a drop in the voltage or absence of voltage on AC signal 1010 and cause a reduction in the amount of power delivered to the LED or LED array. If a dimmer has previously reduced the average voltage on AC signal 1010, then this reduction would cause a reduction in the amount of power delivered to the LED or LED array and the amount of light emitted from the LED or array would be dimmed. As a result, the LED driver circuit is able to effectively function in pre-existing halogen lighting system including those that contain dimming functionality.

Figure 11:
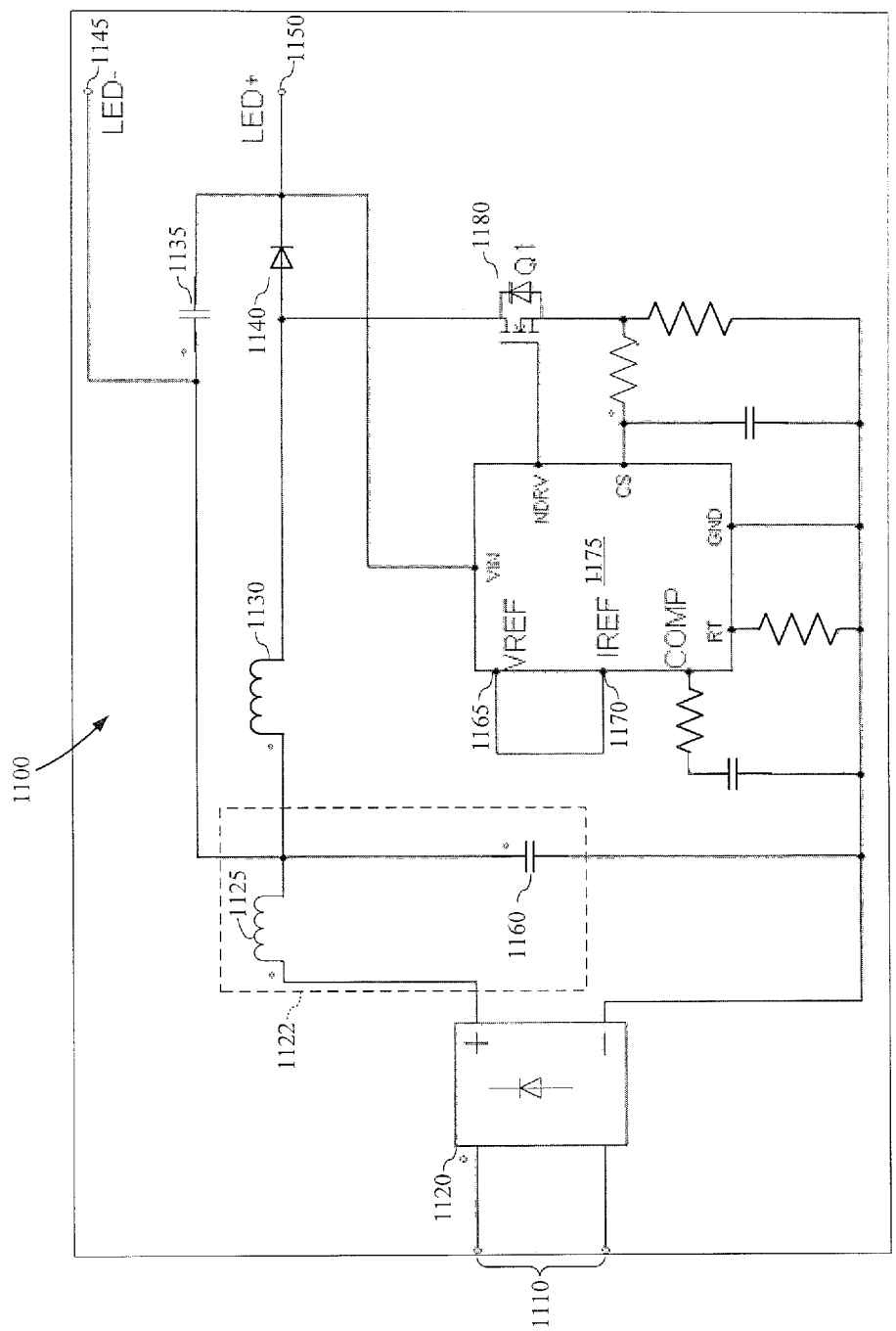
FIG. 11 is circuit diagram of a second buck-boost mode according to various embodiments of the invention.

FIG. 11 illustrates a first driver circuit 1100 of an averaged current mode controlled LED driver according to various embodiments of the invention. As shown in FIG. 11, AC signal 1110 is received by bridge rectifier 1120 and converted to a DC signal. An LC filter 1122 is included in the output of rectifier 1120 and comprises a first inductor 1125 and a first capacitor 1160. LC filter 1122 removes switching frequency noise from the DC output of bridge rectifier 1120.

Control circuitry 1175 controls current drawn from the LC filter 1122 and defines the amount of power to be delivered across LED − and + nodes 1145, 1150 connected across an LED load. Control circuitry 1175 controls this current by analyzing the output from LC filter 1122 relative to one or more internally provided reference currents or voltages. In this particular case, a voltage reference (VREF) 1165 and a current reference (IREF) 1170 are provided by circuit 1175. In response to this analysis, a switch 1180 is controlled by control circuitry 1175 to control the amount of current drawn from LC filter 1122.

A smoothing capacitor 1135 is also provided across LED nodes 1145, 1150 to smooth the signal provided to the nodes.

Figure 12:
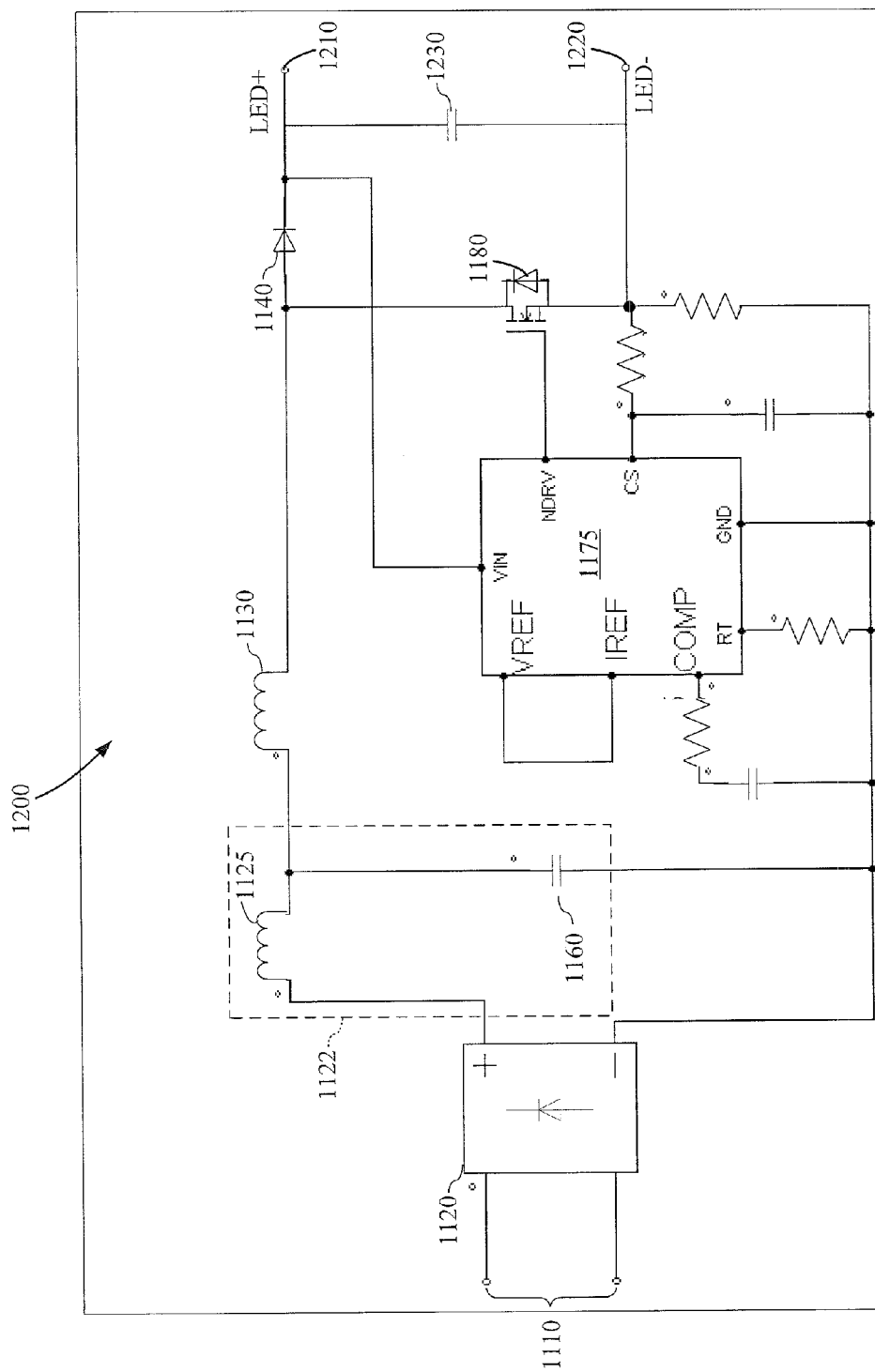
FIG. 12 is a circuit diagram of a second example of an averaged current mode controlled LED boost mode according to various embodiments of the invention.

FIG. 12 illustrates another example of an averaged current mode controlled LED driver circuit 1200 according to various embodiments of the invention. In this example, negative LED node 1220 is connected such that it is coupled to the control circuitry 1175 through switch 1180. A smoothing capacitor 1230 is coupled across the LED + and − nodes 1210, 1220. This configuration allows more power to be delivered across nodes 1210, 1220 than possible in the previous configuration of FIG. 11 and, further, facilitates the deployment of a larger amount of power to a larger LED array or cluster of LEDs.

One skilled in the art will recognize that other components and functionality may be inserted within the specific examples shown in FIGS. 11 and 12. Additionally, these examples may be modified to handle different power characteristics of LEDs, LED strings as well as electronic transformers and dimmers.

It will be appreciated to those skilled in the art that the preceding examples and embodiments are exemplary and are for purposes of clarity and understanding and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is, therefore, intended that the following appended claims include all such modifications, permutation and equivalents as fall within the true spirit and scope of the present invention.

I claim:

1. An LED driver circuit for dimming the output intensity of solid state lighting devices, the circuit comprising:
   a driver circuit that is compatible with an electronic transformer and configured to couple to a solid state lighting device, the driver circuit controls an input current drawn by the driver circuit to provide a programmed average power output to the solid state lighting device based on the driver input current;
   an LC filter coupled between a power source and the driver circuit; and
   a switching device coupled to an output of the driver circuit and to the solid state lighting device, the driver circuit controls the switching device by analyzing an output from LC filter relative to an internally provided reference, the driver circuit provides the programmed average power output such that a dimming operation performed on the driver input current causes a power variation within the programmed average power output.

2. The circuit of claim 1, wherein the driver input current is a rectified AC signal.

3. The circuit of claim 2, wherein the driver input current is programmable to be proportional to the rectified AC signal.

4. The circuit of claim 2, further comprising an output capacitor coupled to both the switching device and a cathode of a solid state lighting device array to generate a current through the switching device that follows the rectified AC signal.

5. The circuit of claim 2, wherein the LC filter reduces output noise in the rectified input current to the driver circuit.

6. The circuit of claim 1, further comprising a stepdown transformer coupled between the driver input current and the driver circuit, the stepdown transformer receives an alternating driver input current and varies an intensity output of the solid state lighting device.

7. The circuit of claim 1, further comprising a control loop coupled to the drive circuit, the control loop that controls the driver input current to be proportional to an input voltage to the driver circuit.

8. The circuit of claim 1, further comprising a bias resistor and a bias capacitor coupled in parallel to the driver circuit to provide an initial startup voltage to power the driver circuit.

9. The circuit of claim 1, further comprising a transformer that provides isolation between the driver input current and the solid state lighting device.

10. The circuit of claim 1, wherein the switching device has a switching frequency and a duty cycle.

11. The circuit of claim 10, further comprising a peak current mode control loop that controls the duty cycle.

12. The circuit of claim 11, further comprising a compensation circuit that reduces sub-harmonic oscillations in the peak current mode control loop.

13. The circuit of claim 1, further comprising a sensing element configured to sense a sensing signal, the sensing element is used for cycle-by-cycle current mode control function in the driver circuit to control the switching device.

14. The circuit of claim 1, wherein the switching frequency is controlled by a regulated voltage.

15. The circuit of claim 1, wherein the electronic transformer is coupled to a dimmer and an input AC signal, the dimmer that adjusts an average voltage of the input AC signal to adjust a combined average voltage provided to the electronic transformer.

16. The circuit of claim 15, wherein the combined average voltage causes a modification of the average power delivered to a load.

17. The circuit of claim 16, wherein the dimmer is a trailing-edge dimmer and the load is a halogen lamp.

18. The circuit of claim 15, wherein the input current is in phase with the input AC signal.

19. The circuit of claim 15, wherein the input current follows a programmed waveform.

* * * * *